(12) United States Patent
Sheng et al.

(10) Patent No.: US 11,503,460 B2
(45) Date of Patent: Nov. 15, 2022

(54) METHOD FOR WEARABLE DEVICE TO WORK AS NET DISK OF MOBILE PHONE TO PROTECT USERS PRIVATE DATA

(71) Applicant: ARRIS Enterprises LLC, Suwanee, GA (US)

(72) Inventors: Libo Sheng, Shanghai (CN); Jianguo Zhou, Shanghai (CN); Fenggen Hu, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 242 days.

(21) Appl. No.: 16/764,636

(22) PCT Filed: Dec. 13, 2017

(86) PCT No.: PCT/CN2017/115927
§ 371 (c)(1),
(2) Date: May 15, 2020

(87) PCT Pub. No.: WO2019/113835
PCT Pub. Date: Jun. 20, 2019

(65) Prior Publication Data
US 2020/0404491 A1    Dec. 24, 2020

(51) Int. Cl.
*G06F 3/0482*    (2013.01)
*H04W 12/02*    (2009.01)
(Continued)

(52) U.S. Cl.
CPC .......... *H04W 12/02* (2013.01); *G06F 3/0482* (2013.01); *G06F 3/14* (2013.01); *H04B 1/385* (2013.01);
(Continued)

(58) Field of Classification Search
CPC . H04W 12/02; H04W 1/72412; H04W 12/50; H04B 1/385
See application file for complete search history.

(56) References Cited

U.S. PATENT DOCUMENTS 9,495,529 B2 * 11/2016 Kim ........................ A61B 5/112
10,353,532 B1 * 7/2019 Holz ................... G06F 3/04815
(Continued)

FOREIGN PATENT DOCUMENTS

| CN | 1630391 | 6/2005 |
|---|---|---|
| CN | 105791305 | 7/2016 |

OTHER PUBLICATIONS

International Search Report dated Aug. 29, 2018 in International (PCT) Application No. PCT/CN2017/115927.

*Primary Examiner* — Andrea C Leggett
(74) *Attorney, Agent, or Firm* — Wenderoth, Lind & Ponack, L.L.P.

(57) ABSTRACT

A mobile device pairs with a wearable device via a wireless network. The mobile device receives private user data from the wearable device via the wireless network. The mobile device does not store the private user data in volatile or non-volatile storage before receiving the private user data from the wearable device. The mobile device stores the private user data received from the wearable device only in volatile storage. In response to user input, the mobile device modifies the private user data in the volatile storage. The mobile device synchronizes the private user data on the mobile device with the wearable device by sending the modified private user data or a portion thereof to the wearable device. In response to generation of a deletion command, the mobile device releases the modified private user data.

20 Claims, 6 Drawing Sheets

(51) Int. Cl.
*H04M 1/72412* (2021.01)
*H04W 12/50* (2021.01)
*G06F 3/14* (2006.01)
*H04B 1/3827* (2015.01)
*G06F 21/32* (2013.01)

(52) U.S. Cl.
CPC ....... *H04M 1/72412* (2021.01); *H04W 12/50* (2021.01); *G06F 21/32* (2013.01)

(56) References Cited

U.S. PATENT DOCUMENTS

| | | | |
|---|---|---|---|
| 2016/0036953 A1* | 2/2016 | Lee | H04M 1/05 455/426.1 |
| 2016/0171201 A1 | 6/2016 | Schroder | |
| 2016/0306988 A1 | 10/2016 | Lu et al. | |

* cited by examiner

METHOD FOR WEARABLE DEVICE TO WORK AS NET DISK OF MOBILE PHONE TO PROTECT USERS PRIVATE DATA

TECHNICAL FIELD

The examples described herein, in general, relate to techniques and equipment to secure private user data in a system that includes a wearable device and a mobile device.

BACKGROUND

A users' mobile devices, such as smartphones or tablet computers, store private user data, such as pictures, videos, bank account information, credit card information, account login information (e.g., a user id or a password for an application such as Facebook or an email account), text messages, contacts (e.g., name, email address, phone no., residence address), calendar appointments, emails, etc. Unfortunately, sometimes a user's mobile device is lost. In addition to the inconvenience of losing access to the stored information, loss of the device represents a security risk should the device fall into the wrong hands.

Solutions, such as encryption and password protection, exist to protect private user data. Cloud-based solutions, such as the Apple® iCloud also prove secondary storage for the private user data. But these solutions are not necessarily secure, for example, as demonstrated by the cracking of the Apple® iCloud in the year 2015. Currently, private user data is still vulnerable to a breach, such as by hackers attempting to crack the private data and leverage the user private user data, for example, by utilizing bank account information for financial gain.

SUMMARY

In an example, a mobile device includes a wireless network communication interface for communication over a wireless network, a processor coupled to the wireless network communication interface, a memory accessible to the processor, and programming in the memory. Execution of the programming by the processor configures the mobile device to perform functions, including functions to pair the mobile device with a first wearable device of a plurality of wearable devices via the wireless network and receive first private user data from the first wearable device via the wireless network. The mobile device does not store the first private user data in volatile or non-volatile storage before receiving the first private user data from the first wearable device. The programming further includes functions to store the first private user data received from the first wearable device only in volatile storage on the mobile device; and, in response to a first user input on the mobile device that changes the first private user data, modify the first private user data in the volatile storage. The first modified private user data includes the first private user data received from the first wearable device and the changes from the first user input on the mobile device. The programming further includes functions to synchronize the first private user data on the mobile device with the first wearable device by sending the first modified private user data or a portion thereof to the first wearable device and in response to generation of a deletion command, release the first modified private user data.

In another example, a wearable device includes a wireless network communication interface for communication over a wireless network, a processor coupled to the wireless network communication interface, a memory accessible to the processor, and programming in the memory. Execution of the programming by the processor configures the wearable device to perform functions, including functions to pair the wearable device with a mobile device via the wireless network and send private user data to the mobile device via the wireless network. The programming further includes functions to receive updated private user data from the mobile device and send a deletion command to delete the private user data and the updated private user data on the mobile device.

In another example, a non-transitory machine-readable medium contains machine-readable programming instructions. The instructions cause a mobile device to pair a mobile device with a plurality of wearable devices via at least one wireless network and receive respective private user data from a respective wearable device via the at least one wireless network. The mobile device does not store the respective private user data in volatile or non-volatile storage before receiving the respective private user data from the respective wearable device. The instructions further cause the mobile device to store the respective private user data received from the respective wearable device in volatile storage on the mobile device; and in response to generation of a deletion command received from the respective wearable device, release the respective modified private user data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The figures depict one or more implementations in accordance with the present teachings by way of example only, not by way of limitation. In the figures, like reference numbers refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detailed comment in order to avoid unnecessarily obscuring aspects of the present teachings.

Figure 1:
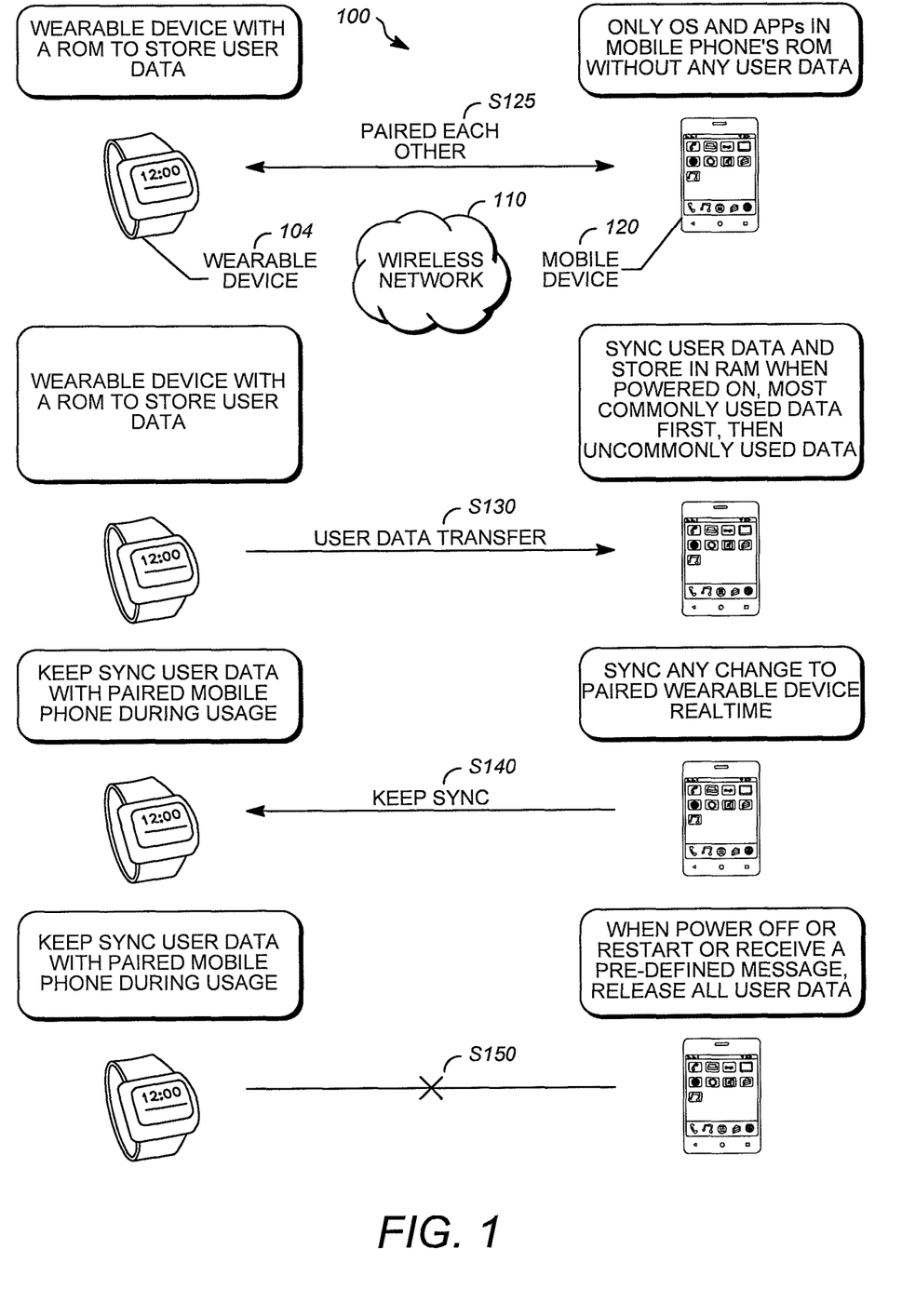
FIG. 1 is a ping pong diagram of high level operations of a system that includes a mobile device, a wearable device, and a wireless network in which the wearable device permanently stores private user data.

Shown in the diagram of FIG. 1 is an example system 100 that includes a wearable device 104 and a mobile device 120. The wearable device 104 can be a credit card, watch, necklace, wristband, key chain, key fob device, device implanted under a human's skin, or other portable device designed to communicate via one or more wireless networks or wireless links with mobile device 120.

In the example, a net disk on a user's wearable device 104 is set up and configured to allow safer storage of private user data by having the private user data persistently stored in non-volatile storage on the wearable device 104 instead of the mobile device 120. Due to the wearable device 104 being in closer proximity to the user and worn by the user, the wearable device 104 is an appropriate and safer storage medium than the mobile device 120 for private user data because there is less chance of the wearable device 104 being lost than the mobile device 120. In this way, when the mobile device 120 is lost, the private user data is not lost and the risk of the private user data being exposed to others is lower.

It should be understood that non-volatile memory is typically used for the task of secondary storage, or long-term persistent storage. Non-volatile memory allows retrieval of stored information even after having been power cycled (turned off and back on) one or more times. Examples of non-volatile memory include read-only memory, flash memory, ferroelectric RAM, most types of magnetic computer storage devices (e.g. hard disk drives, floppy disks, and magnetic tape), and optical discs. Volatile memory is a non-persistent storage which needs constant power in order to prevent data from being erased. The most widely used form of volatile storage is a random access memory (RAM), including dynamic and static RAM types. When a device is shut down, anything contained in volatile storage is lost, hence volatile storage is considered non-persistent. Volatile memory retains data while powered on but when the power is interrupted, the stored data is lost immediately or very rapidly. Of course data may be selectively deleted from volatile memory and/or from most forms of non-volatile memory upon command. With the size of RAM increasing in mobile devices (4 GB in 2015 and 6 GB now), the RAM space is now of sufficient size to store the entirety of the private user data temporarily.

In an example, only the operating system and executable applications are stored in persistent storage of the mobile device 120 before transfer of the private user data from the wearable device 104. When the mobile device 120 is powered on, the mobile device 120 synchronizes the most commonly used private user data (such as Outlook or Google contacts, messages, Facebook, etc.). Less frequently used private user data can be transferred when needed. Priority of synchronization is a field that can be defined by the user by the paired wearable device 104 and is stored in non-persistent volatile storage (e.g., RAM) of the mobile device 120.

During usage of the mobile device 120, the private user data is synchronized between the mobile device 120 and the wearable device 104. Then, when the mobile device 120 is powered off or restarted, all private user data residing in the volatile storage is released, for example, the mobile device 120 is wiped of private user data entirely since no data is stored in non-volatile storage. When the user loses the mobile device 120, the private user data is deleted when the mobile device 120 eventually runs out of the battery or otherwise loses power; or the user can send a message to the mobile device 120 to release the data. In another example, when the user starts to use a different mobile device, the private user data does not need to be transferred from the mobile device 120, rather the user can simply pair the different mobile device with the wearable device 104.

The mobile device 120 can be such a smartphone, laptop/personal computer, and a tablet computer. Although only a single mobile device 120 and wearable device 104 are shown, it should be understood that any number of mobile devices and wearable devices may be in communication via the wireless network 110.

A network is also included, shown as a wireless communication network 110. The network can be wireless or wired. Wireless network 110 can be via Bluetooth, Digital Enhanced Cordless Telecommunications (DECT), Wi-Fi, a wireless mesh network (e.g., ZigBee), near field communication (NFC), etc.

As shown in S125, one type of communication link or connection between the wearable device 104 and the mobile device 120 is established by, for example, pairing the mobile device 120 with the wearable device 104. Although this operation is described as "pairing" it is not limited to Bluetooth pairing but may include any similar protocol by which the wearable device 104 and mobile device 120 are linked for transmitting or obtaining private user data.

Initially, the wearable device 104 comprises a memory, such as a flash memory or read only memory (ROM), that is persistent non-volatile storage storing private user data. During pairing and connection, the wearable device 104 can be paired with the mobile device 120 through certain near field communication protocols, including Bluetooth, NFC, WiFi, peer-to-peer, ZigBee, other mesh or short range network, etc. Bluetooth, NFC, radio frequency identifier (RFID) ultrasonic, and infrared transceiver communications can take place over short range (SR) networks. Alternatively, the wearable device 104 can be paired with the mobile device 120 through certain telecommunication networks such as 4G/5G, etc. In another example, the wearable device 104 can be paired with the mobile device 120 through a quick response (QR) code.

In step S130, private user data is transferred from the wearable device 104 to the mobile device 120. Prior to the transfer of the private user data from the wearable device 104 to the mobile device 120, the mobile device 120 includes an operating system and applications stored in persistent non-volatile storage, but does not store any private user data.

In one example, when the mobile device 120 is powered on, the pairing process occurs after which private user data is transferred form the wearable device 104 to the mobile device 120 where it is then stored in random access memory (RAM) on the mobile device 120. The most commonly used private user data can be transferred first followed by less frequently used private user data based on automated usage tracking by the mobile device 120 or user selection of which data to prioritize during transfer of the private user data.

In step S140, the wearable device 104 and mobile device 120 maintain synchronization. Once paired successfully, the wearable device 104 and mobile device 120 can be synchronized in real time or periodically (as configured). For example, the user can select a real time synchronization option or input a time interval (e.g. 30 seconds.) for periodically synchronizing the wearable device 104 with the mobile device 120.

The user of the mobile device 120 can configure certain synchronization strategies. For example, if the paired wearable device 104 cannot be detected in a predefined time period, the user may select that the mobile device 120 immediately flush the private user data in the mobile device 120. Alternatively, the user of the mobile device 120 may select that the mobile device 120 reconnect to the paired wearable device 104 for a predetermined number of reconnection attempts, and then take predefined actions (as configured). The number of reconnection attempts can be selected by the user, for example 3 times or 6 times. If a connection cannot be established, the mobile device 120 may send the private user data to a cloud server if the reconnection to the paired wearable device 104 fails. If the mobile device 120 has data stored in cloud servers and subsequently detects the paired wearable device 104 is later re-connected, the cloud-based data will be synchronized to the wearable device 104 via the mobile device 120.

The wearable device 104 can be paired with the mobile device 120 through a certain communication protocol, but can communicate with the mobile device 120 and other mobile devices for data synchronization. For example, the wearable device 104 can pair with and communicate with a plurality of mobile devices and the mobile device 120 can pair with and communicate with a plurality of wearable devices. Any changes to the private user data on the mobile device 120 can be propagated back to the wearable device 104 to deliver to other mobile devices via the wearable device 104. Hence, when multiple mobile devices are modifying private user data, the private user data modified on a first mobile device may be synchronized to the second mobile device via the wearable device 104.

If the mobile device 120 is paired to a number of wearable devices, the mobile device 120 can configure the synchronization strategies. For example, the user may select the mobile device 120 to synchronize the private user data to all of the paired wearable devices or to only synchronize the data to certain selected paired wearable devices in a particular order. For example, the mobile device 120 may list all of the paired wearable devices with the mobile device 120 through an application or user interface displayed on the mobile device 120, and then the user can select whether one wearable device or all wearable devices are synchronized with the mobile device 120.

The mobile device 120 can also configure which private user data stored in the paired wearable devices is synchronized back to the mobile device 120. For example, some private user data (e.g. highly confidential information) in mobile device 120 can be synchronized to the wearable devices, but these devices never synchronize the highly confidential information back to the mobile device 120 or other selected mobile devices. For example, the private user data may include different category types of data that can be stored in the paired wearable devices, such as photos, videos, documents, data information for applications, and then the user may select via a graphical user interface which category type is synchronized back to the mobile device 120 from the paired wearable devices. The graphical user interface may be displayed in application on the wearable device 104 or the mobile device 120 to allows the user to select which category type of private user data is synchronized to newly paired mobile devices. All, a part of, or none of the private user data synchronized from old mobile devices can be re-synchronized to newly paired mobile devices via the user's selection in the graphical user interface.

Continuing to step S150, upon power off, restart, or receiving a pre-defined message, the mobile device 120 releases all of the private user data. For example, if power is turned off or the mobile device 120 is restarted, all private user data stored in the volatile memory of the mobile device 120 is erased. Hence, no trace of the private user data is left on the mobile device 120 since the private user data is never stored in non-volatile storage of the mobile device 120 to begin with.

In some examples, the wearable device 104 can be used for offloading big data files (e.g., video) and preloading content to be watched later on the mobile device 120 (e.g., while the mobile device 120 is charging). For example, if the user wants to download/copy new content to the mobile device 120, and the storage capacity is almost full, the user is able to move some existing big files to the wearable device 104 from the mobile device 120 to provide storage capacity on the mobile device 120.

Figure 2:
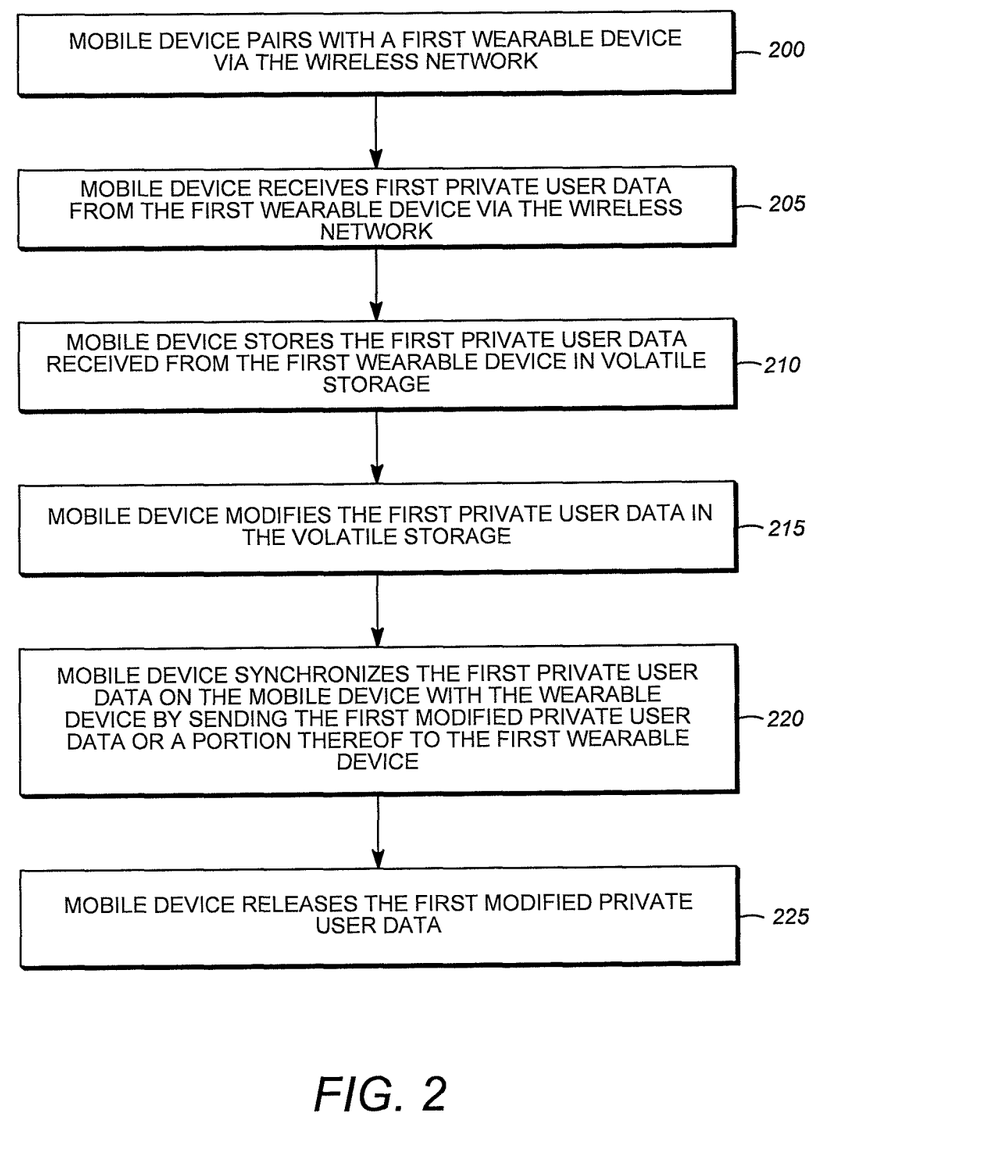
FIG. 2 is a flowchart of the operation of the mobile device in FIG. 1, when retrieving private user data, such as via a wireless network, and modifying and synchronizing private user data with the wearable device.

FIG. 2 illustrates a procedural flow executed on a mobile device 120 of FIG. 1 when retrieving private user data, such as via a wireless network, and modifying and synchronizing private user data with the wearable device 104. Although shown as occurring serially, the blocks of FIG. 2 may be reordered or parallelized depending on the implementation.

Beginning in step 200, the mobile device pairs with a first wearable device of a plurality of wearable devices via the wireless network. Pairing the mobile device with the first wearable device via the wireless network can include: assigning a first wearable device identifier to the first wearable device; generating a first wearable device entry in a wearable device table that is stored in a wearable device database; and storing the first wearable device identifier in the first wearable device entry. The wireless network can be Bluetooth, near field communication (NFC), WiFi, ZigBee, or a mobile telecommunication network.

The first wearable device identifier can be at least one of a network address, a model number, or a serial number. The network address can be a WiFi, media access control (MAC), Internet Protocol (IP), Bluetooth, ZigBee, Digital Enhanced Cordless Telecommunications (DECT), or Near Field Communication (NFC) address.

Moving to step 205, the mobile device receives first private user data from the first wearable device via the wireless network. The mobile device does not store the first private user data in volatile or non-volatile storage before receiving the first private user data from the first wearable device. In step 210, the mobile device stores the first private user data received from the first wearable device in volatile storage on the mobile device. The first private user data can includes a picture, a video, bank account information, credit card information, a user id, a password, an email, or a text message.

Continuing to step 215, the mobile device modifies the first private user data in the volatile storage, for example, in response to a first user input on the mobile device that changes the first private user data. The first modified private user data includes the first private user data received from the first wearable device and the changes from the first user input on the mobile device.

Proceeding to step 220, the mobile device synchronizes the first private user data on the mobile device with the first wearable device by sending the first modified private user data or a portion thereof to the first wearable device. The first modified private user data or the portion thereof can be sent in real time to the first wearable device or periodically at or after a synchronization time period that is an adjustable time interval set by a user of the mobile device.

In step 225, the mobile device releases the first modified private user data, for example, in response to generation of a deletion command. Releasing the first modified private user data can include sending the first modified private user data in a final state to the first wearable device and deleting the first modified private user data from the mobile device. The deletion command can be generated in response to a shutdown signal being inputted on the mobile device to power off or restart the mobile device. In response to releasing the first modified private user data, the mobile device unpairs the first wearable device from the mobile device via the wireless network. In another example, the deletion command is generated in response to a timeout period elapsing in which the mobile device fails to communicate with the first wearable device via the wireless network or after a predetermined number of reconnection attempts with the first wearable device is exceeded. In response to generation of the deletion command, the mobile device removes the first wearable device entry from the wearable device table.

Additional steps can be performed when the mobile device is paired with additional wearable devices, such as a second wearable device as outlined in FIG. 4 below. For example, the mobile device pairs with a second wearable device of the plurality of wearable devices via the wireless network by: assigning a second wearable device identifier to the second wearable device; generating a second wearable device entry in the wearable device table; and storing the second wearable device identifier in the second wearable device entry. The mobile device receives second private user data from the second wearable device via the wireless network. The mobile device does not store the second private user data in volatile or non-volatile storage before receiving the second private user data. The mobile device stores the second private user data received from the second wearable device in volatile storage on the mobile device in association with the second wearable device identifier where the second private user data originated. In response to a second user input on the mobile device that changes the second private user data, the mobile device modifies the second private user data in the volatile storage. The second modified private user data includes the second private user data received from the second wearable device and the changes from the second user input on the mobile device.

In response to pairing the mobile device with the second wearable device via the wireless network, the mobile device displays a list of the paired wearable devices in a graphical user interface on the mobile device. The mobile device receives a user selection of one or more of the paired wearable devices to synchronize the first or second modified private user data with from the graphical user interface. In response to the user selection from the graphical user interface, the mobile device selectively synchronizes the first or second modified private user data on the mobile device with the selected wearable devices.

Alternatively or additionally, storing the first private user data from the first wearable device in volatile storage on the mobile device can include storing the first private user data in association with the first wearable device identifier where the first private user data originated. The mobile device selectively synchronizes the second private user data with only the second wearable device by only sending the second modified private user data or a portion thereof to the second wearable device based on the stored associated second wearable device identifier.

In one example, the second wearable device entry of the wearable device table includes a modification status field indicating whether the second private user data received from the second wearable device is modified. The modification status field is set in response to the second user input on the mobile device that changes the second private user data. In response to the second user input on the mobile device that changes the second private user data received from the second wearable device stored in the volatile memory, the mobile device sets the modification status field to indicate modification of the second private user data. In response to setting of the modification status field, the mobile synchronizes changes to the second private user data to the second wearable device.

Additionally, in response to a third user input on the mobile device that changes the first modified private user data, the mobile device alters the first modified private user data in the volatile storage. The first altered modified private user data includes the first modified private user data and the changes from the third user input on the mobile device. The mobile device detects a timeout period elapsing in which the mobile device fails to communicate with the first wearable device via the wireless network or a predetermined number of reconnection attempts with the first wearable device is exceeded. In response to detecting the timeout period elapsing or the predetermined number of reconnection attempts with the first wearable device is exceeded, the mobile device synchronizes the first altered modified private user data on the mobile device with the second wearable device by sending the first altered modified private user data or a portion thereof to the second wearable device. Subsequently, the mobile device updates the first wearable device entry of the wearable device table to delete the first wearable device identifier and store the second wearable device identifier.

Figure 3:
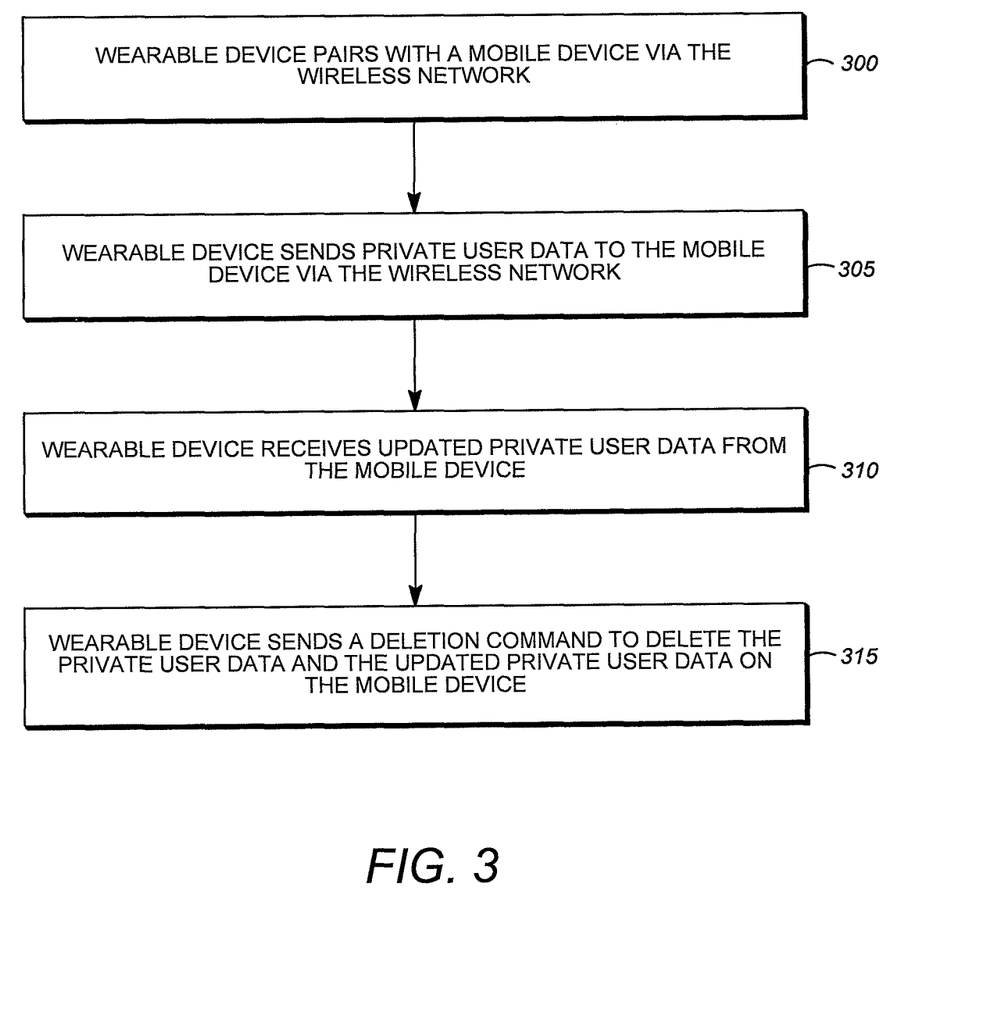
FIG. 3 is a flowchart of the operation of the wearable device in FIG. 1, when serving as a permanent storage device for the private user data, including during communications with the mobile device.

FIG. 3 is a procedural flow of the operation of the wearable device 104 in FIG. 1, when serving as a permanent storage device for the private user data, including during communications with the mobile device 120. Although shown as occurring serially, the blocks of FIG. 3 may be reordered or parallelized depending on the implementation.

Beginning in step 300, the wearable device pairs with a mobile device via the wireless network as outlined in FIGS. 1-2 above. Continuing to step 305, the wearable device sends private user data to the mobile device via the wireless network as outlined in FIGS. 1-2 above. In step 310, the wearable device receives updated private user data from the mobile device as outlined in FIGS. 1-2 above. Finishing in step 315, the wearable device sends a deletion command to delete the private user data and the updated private user data on the mobile device. The deletion command can be sent in response to a shutdown signal being inputted on the wearable device to power off or restart the wearable device.

Figure 4:
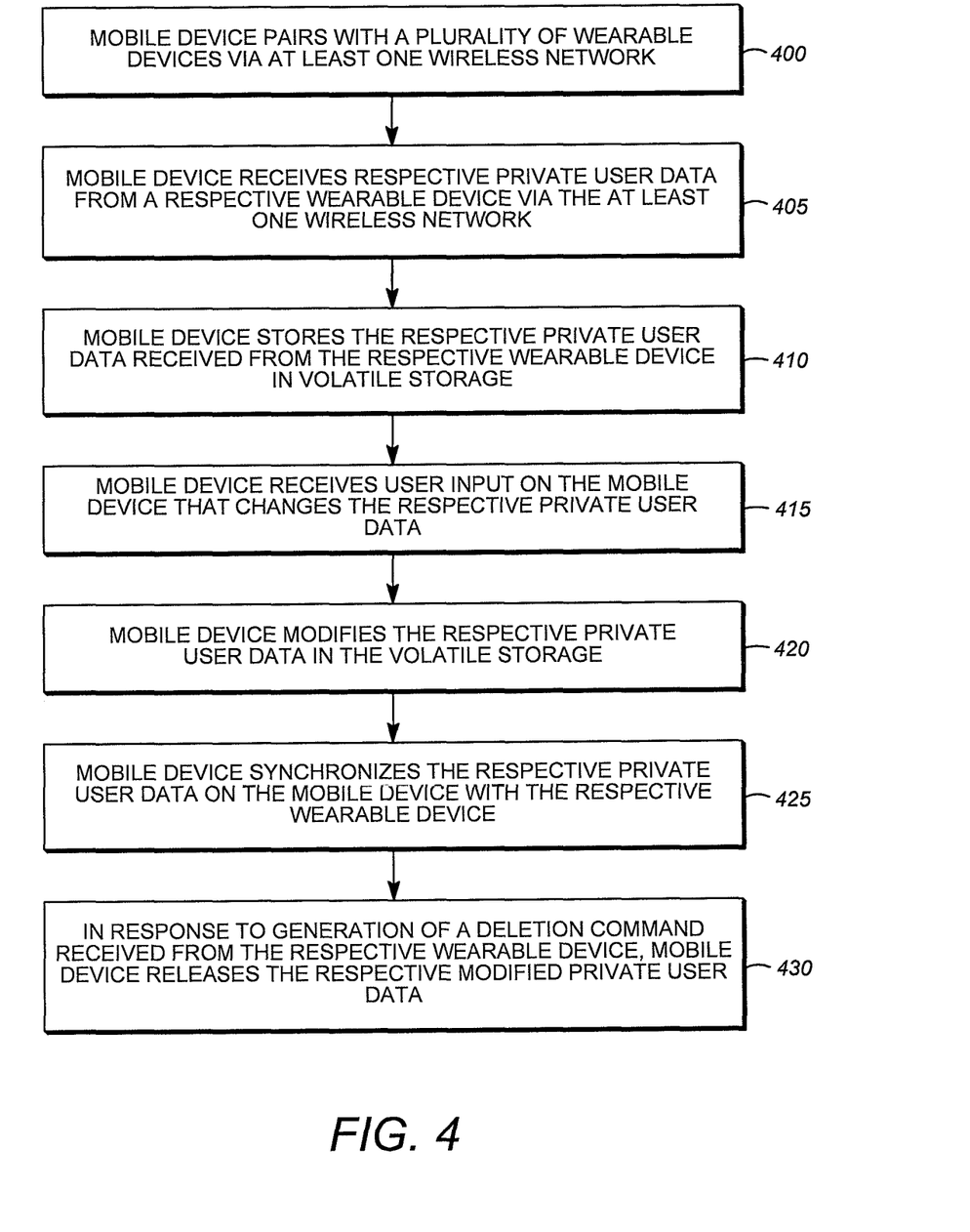
FIG. 4 is another flowchart of the operation of the mobile device in FIG. 1, when retrieving and processing private user data from multiple wearable devices.

FIG. 4 is another flowchart of the operation of the mobile device 120 in FIG. 1, when retrieving and processing private user data from multiple wearable devices. Although shown as occurring serially, the blocks of FIG. 4 may be reordered or parallelized depending on the implementation.

Beginning in step 400, the mobile device pairs with a plurality of wearable devices via at least one wireless network. For example, after pairing with the first wearable device the mobile device pairs with a second wearable device of the plurality of wearable devices via the at least one wireless network by: assigning a second wearable device identifier to the second wearable device; generating a second wearable device entry in the wearable device table; and storing the second wearable device identifier in the second wearable device entry.

Moving to step 405, the mobile device receives respective private user data from a respective wearable device via the at least one wireless network. For example, after receiving first private user data from the first wearable device, the mobile device receives second private user data from the second wearable device via the at least one wireless network. The mobile device does not store the respective private user data in volatile or non-volatile storage before receiving the respective private user data from the respective wearable device.

Continuing to step 410, the mobile device stores the respective private user data received from the respective wearable device in volatile storage on the mobile device. For example, after storing first private user received from a first wearable device, the mobile device stores the second private user data received from the second wearable device in volatile storage on the mobile device in association with the second wearable device identifier where the second private user data originated.

Moving now to step 415, the mobile device receives user input on the mobile device that changes the respective private user data. Next, in step 420, in response to the user input, modifies the respective private user data in the volatile storage. The respective modified private user data includes the respective private user data received from the respective wearable device and the changes from the user input on the mobile device.

Proceeding to step 425, the mobile device synchronizes the respective private user data on the mobile device with the respective wearable device by sending the respective modified private user data or a portion thereof to the respective wearable device. Finishing now in step 430, the mobile device releases the respective modified private user data, for example, in response to generation of a deletion command received from the respective wearable device. Releasing the modified private user data can include sending the respective modified private user data in a final state to the respective wearable device; and deleting the respective modified private user data from the volatile storage of the mobile device.

Figure 5:
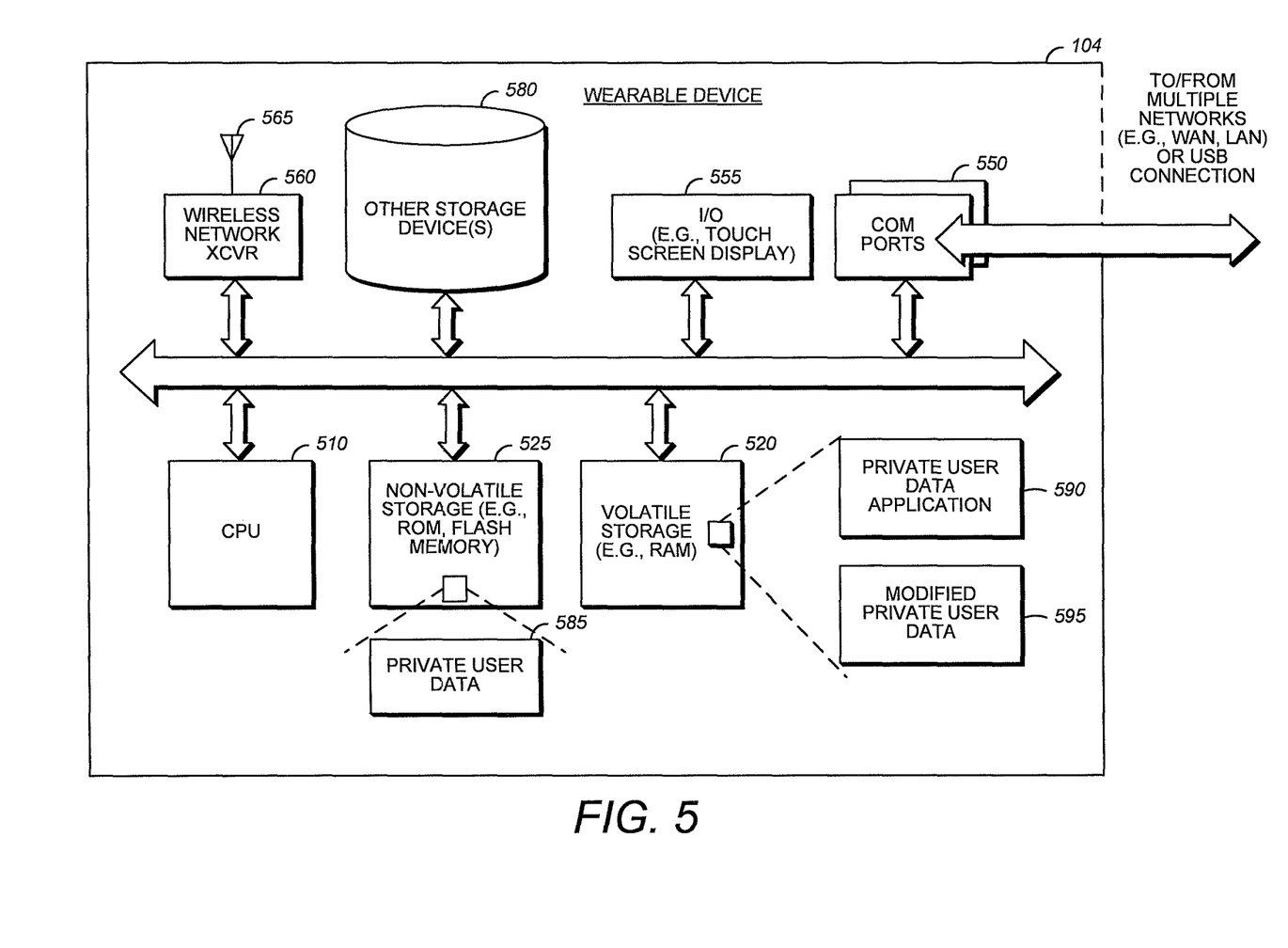
FIG. 5 shows an example of a hardware configuration for the wearable device in FIG. 1, in simplified block diagram form.

FIG. 5 shows an example of a hardware configuration for the wearable device 104 in FIG. 1, in simplified block diagram form. In this example, the example the wearable device 104 also includes a wireless network communication interface, show as wireless network transceiver 560, for communication with the mobile device 120. The wireless network transceiver 560 may be a short range wireless transceiver configured to communicate with mobile devices. Wireless network transceiver 560 includes an antenna 565 and may also be used to communicate with various mobile device(s) 120 (e.g., smart phone, tablet, or laptop computer). The various wireless network technologies may include (but are not limited) to: Bluetooth, ZigBee, DECT, and NFC.

The wearable device 104 may include additional communication ports (com ports) 550 that are for wired or wireless communication over multiple networks (e.g., WAN, LAN), USB connection, or any available data communication technology. Like the wireless network transceiver 560, com ports 550 can allow the wearable device 104 communicate with various mobile devices such that the wearable device 104 can behave as a net disk for the mobile device 120.

The wearable device 104 also includes circuits forming one or more processors to implement a central processing unit (CPU) 510 that controls operations of the wearable device 104, including performing the processing to serve as an appropriate and safer storage medium than the mobile device 120 for private user data.

As shown, the wearable device 104 includes persistent non-volatile storage 525, such as ROM or flash memory for permanently storing private user data 585. The volatile storage 520 temporarily stores private user data, including the modified private user data 595 which is communicated from a mobile device and also stores various programming instructions. In the example, wearable device 104 includes non-persistent volatile storage 520, such as RAM, for storing the modified private user data 595 and a private user data application 590 with instructions to perform the functions or procedures as described above.

The media forming the non-volatile storage 525 serves a permanent storage for the private user data application 590, but the volatile storage 520, is utilized for execution by the CPU 510. For example, execution of the private user data application 590 stored in the volatile storage 520 by the processor 510 configures the wearable device 104 to perform the functions or procedures as described above, for example in FIGS. 1-2. Other storage device(s) 580 may also be provided on the wearable device 104.

The wearable device also includes a user I/O device 555. The user I/O device 555 may include a liquid crystal device (LCD) or light emitting diode (LED) display that provide a touch screen display for displaying information to the user and receiving responsive user input, for example, to control the net disk behavior of the wearable device 104.

In general, the term "application," as used herein, refers to logic embodied in hardware or software instructions, which can be written in a programming language, such as Java™, C, C++, C#, for example. A software application can be compiled into executable programs or written in interpreted programming languages, such as Perl, Visual Basic script, HTML, or JavaScript. Software applications may be callable from other applications. Generally, applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Figure 6:
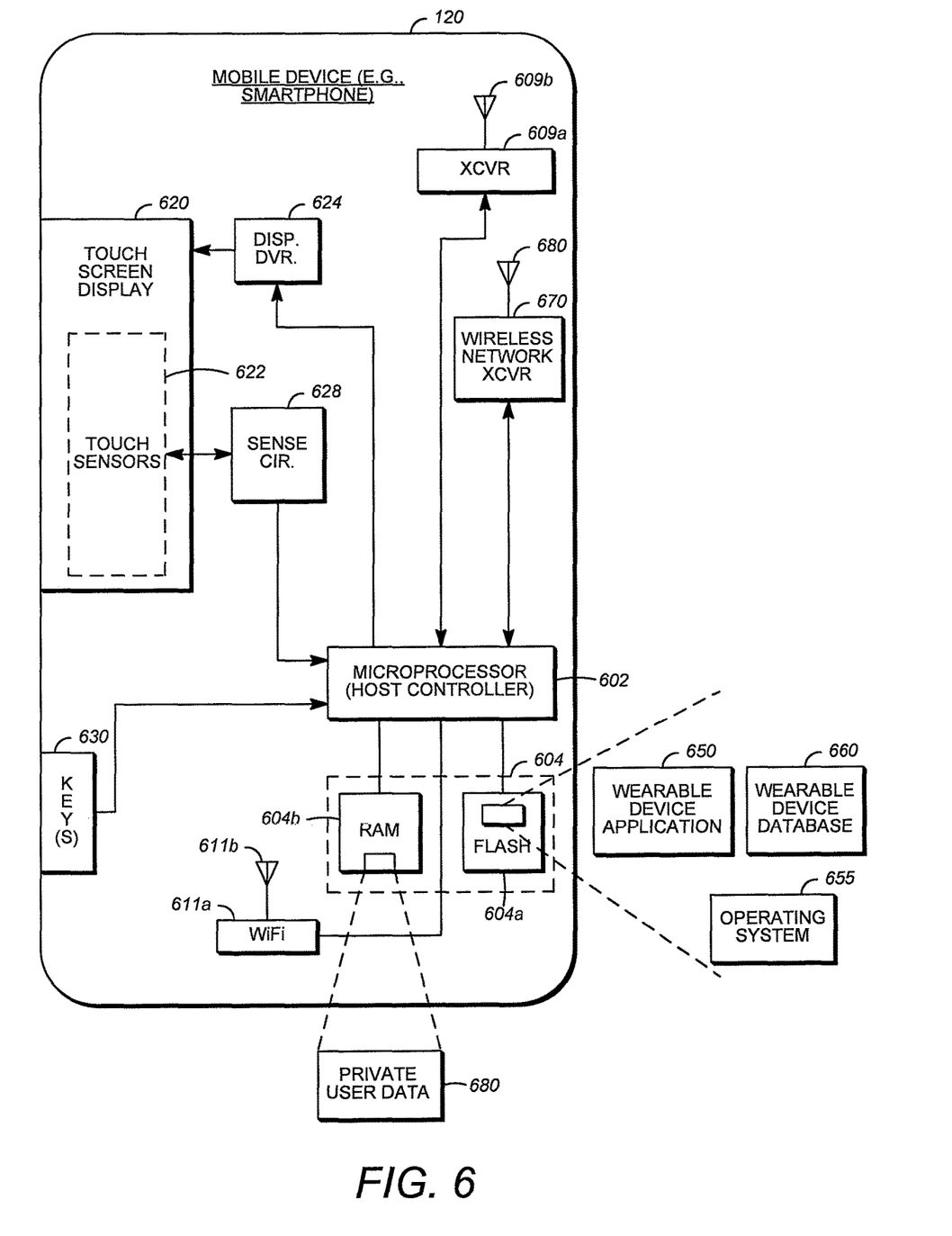
FIG. 6 shows a hardware configuration of the mobile device in FIG. 1, in simplified block diagram form.

FIG. 6 is a high-level functional block diagram of an example of a mobile device 120, such as smartphone, that communicates via the system 100 of FIG. 1.

Shown are elements of a touch screen type of mobile device 120 having the wearable device application 650 loaded, although other non-touch type mobile devices can be used in the private user data communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 6 therefore provides a block diagram illustration of the example smartphone type of mobile device 120 having a touch screen display for displaying content and receiving user input as (or as part of) the user interface.

The activities that are the focus of discussions here typically involve data communications. The example mobile device 120 includes a wireless network transceiver 670 to communicate and interact with wearable devices. The embedded wireless network transceiver 670 can be a short range wireless transceiver. Wireless network transceiver 670 includes an antenna 680 and may also be used to communicate with multiple wearable devices and/or other mobile devices. The various wireless network technologies may include (but are not limited to: Bluetooth, ZigBee, DECT, and NFC.

As shown in FIG. 6, the mobile device 120 includes at least one digital transceiver (XCVR) 609*a*, for digital wireless communications via a wide area wireless mobile communication network for communication with a cloud server or other devices (e.g., mobile or wearable devices) that are connected to the wide area network. The transceiver 609*a* (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 609*a* provides two-way wireless communication of information including digitized audio signals, still image and/or video signals, web page information for display as well as web related inputs, and various types of mobile message communications to/from the mobile device.

Several of these types of communications through the transceiver 609*a* and a network, as discussed previously, relate to protocols and procedures in support of communications with the wearable device for processing private user data. Such communications, for example, may utilize IP packet data transport utilizing the digital wireless transceivers (XCVR) 670 or 609*a* and over the air communications.

In one example, the transceiver 609*a* sends and receives a variety of signaling messages in support of various data services provided by a network of a wireless service provider, to user(s) of smartphone 120 via a mobile communication network (not shown). Transceiver 609*a* connects through radio frequency (RF) send-and-receive amplifiers (not shown) to an antenna 609*b*.

Mobile device 120 also supports wireless local area network communications over Wi-Fi, instead of or in addition to data communications using the wide area mobile communication network. Hence, in the example of FIG. 6, for packet data communications with the wearable device 104 over WiFi, mobile device 120 also includes a Wi-Fi transceiver 611*a* and associated antenna 611*b*. Although Wi-Fi is used here as the example, the transceiver 611*a* may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX.

The transceiver 611*a*, for example, may provide two-way data transport for wireless communication with a wireless access point (shown in FIG. 1) in a residence or enterprise that the user frequents or with any available hotspot offered in a public venue. A Wi-Fi access point communicates with compatible user equipment, such as the smartphone 120A, over the air using the applicable Wi-Fi protocol. The Wi-Fi access point provides network connectivity. In a home or office premises, for example, the Wi-Fi access point would connect directly or via a wireless network (LAN) 110 to a line providing internet access service. In a more public venue, an access point configured as a hotspot may offer similar connectivity for customers or others using the venue, on terms and conditions set by the venue operator. Although communicating through a different network or networks, the transceiver 611*a* supports various types of data communications similar to the packet data communications supported via the mobile network transceiver 609*a*, including communications related to communications to and from wearable devices and other mobile devices.

The wearable device 120 further includes a microprocessor, sometimes referred to herein as the host controller 602. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 602, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in smartphone laptop computer, and tablet.

Returning more specifically to the smartphone 120 example of FIG. 6, the microprocessor 602 serves as a programmable host controller for the mobile device by configuring the mobile device to perform various operations, for example, in accordance with instructions or programming executable by processor 602. For example, such operations may include various general operations of the mobile device 120, as well as operations related to communications with wearable devices. Although a processor may be configured by use of hardwired logic, typical processors in mobile devices are general processing circuits configured by execution of programming.

The mobile device 120 includes a memory or storage system 604, for storing data and programming. In the example, the memory system 604 includes persistent non-volatile storage 604*a*, shown as flash memory and a non-persistent volatile storage 604*b*, shown as random access memory (RAM). The RAM 604*b* serves as short term storage for instructions and data being handled by the processor 602, e.g. as a working data processing memory, and in this case stores the private user data 680 received from a wearable device 104 and stores changes to the private user data, such as modified private user data. The flash memory 604*a* typically provides longer term storage, hence does not store private user data.

Hence, in the example of mobile device 120, the flash memory 604*a* is used to store programming or instructions for execution by the processor 602, including a wearable device application 650 and operating system 655. The mobile device 120 stores and runs a mobile operating system 655 through which specific applications, including the wearable device application 650 (which may be a web browser executing a dynamic web page), run on mobile device 120. Examples of mobile operating systems include Google Android, Apple iOS (I-Phone or iPad devices), Windows Mobile, Amazon Fire OS, RIM BlackBerry operating system, or the like. Flash memory 604*a* is also used to store mobile configuration settings for different mobile applications or services executable at mobile device 120 using processor 602, such as wearable device database 660. The wearable device database stores the wearable device tables, for example, as generated during the pairing procedure between the mobile device 120 and the wearable device 104.

The physical user interface elements of mobile device 120 include a touch screen display 620 (also referred to herein as "touch screen 620" or "display 620"). For output purposes, the touch screen 620 includes a display screen, such as a liquid crystal display (LCD) or the like. The display may be used for part of the user interaction during interaction with private user data, e.g., during pairing with wearable device and modification of the private user data. For input purposes, touch screen display 620 includes a plurality of touch sensors 622. Touch sensors 622 may be used as a biometric sensor that captures a biometric factor, e.g., a touch gesture. Some touch screens incorporate a fingerprint sensor that may be used as another biometric authentication factor input.

Mobile device 120 also includes a sense circuit 628 coupled to touch sensors 622 for detecting the occurrence and relative location/position of each touch with respect to a content display area of touch screen display 620. In this example, sense circuit 628 is configured to provide processor 602 with touch-position information based on user input received via touch sensors 622. In some implementations, processor 402 is configured to correlate the touch position information to specific content being displayed within the content display area on touch screen display 620. The touch-position information captured by the sense circuit 428 and provided to processor 402 may include, but is not limited to, coordinates identifying the location of each detected touch with respect to the display area of touch screen display 420 and a timestamp corresponding to each detected touch position. The display 622 and touch sensor 622 are controlled by display driver 624 and sense control circuit 628 respectively.

Program aspects of the technology may be thought of as "products" or "articles of manufacture" typically in the form of executable code and/or associated data that is carried on or embodied in a type of machine readable medium. For example, programming code could include code for the wearable device and the mobile device to send and receive private user data and other aspects of the protocols described herein that allow for net disk functionality. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a wireless network communication interface for communication over a wireless network;
a processor coupled to the wireless network communication interface;
a memory accessible to the processor; and
programming in the memory, wherein execution of the programming by the processor configures the mobile device to perform functions, including functions to:
pair the mobile device with a first wearable device of a plurality of wearable devices via the wireless network;
receive first private user data from the first wearable device via the wireless network, wherein the mobile device does not store the first private user data in volatile or non-volatile storage before receiving the first private user data from the first wearable device;
store the first private user data received from the first wearable device only in volatile storage on the mobile device;
in response to a first user input on the mobile device that changes the first private user data, modify the first private user data in the volatile storage, the first modified private user data including the first private user data received from the first wearable device and the changes from the first user input on the mobile device;
synchronize the first private user data on the mobile device with the first wearable device by sending the first modified private user data or a portion thereof to the first wearable device; and
in response to generation of a deletion command, release the first modified private user data.

2. The mobile device of claim 1, wherein the release of the first modified private user data includes:
sending the first modified private user data in a final state to the first wearable device; and
deleting the first modified private user data from the mobile device.

3. The mobile device of claim 2, wherein:
the deletion command is generated in response to a shutdown signal being inputted on the mobile device to power off or restart the mobile device; and
the execution of the programming by the processor configures the mobile device to perform a further function to:
in response to releasing the first modified private user data, unpair the first wearable device from the mobile device via the wireless network.

4. The mobile device of claim 2, wherein the deletion command is generated in response to a timeout period elapsing in which the mobile device fails to communicate with the first wearable device via the wireless network or after a predetermined number of reconnection attempts with the first wearable device is exceeded.

5. The mobile device of claim 2:
wherein pairing the mobile device with the first wearable device via the wireless network includes:
assigning a first wearable device identifier to the first wearable device;
generating a first wearable device entry in a wearable device table; and
storing the first wearable device identifier in the first wearable device entry.

6. The mobile device of claim 5, wherein releasing the first modified private user data further includes:
in response to generation of the deletion command, remove the first wearable device entry from the wearable device table.

7. The mobile device of claim 5, wherein:
the first wearable device identifier is at least one of a network address, a model number, or a serial number; and
the network address is a WiFi, media access control (MAC), Internet Protocol (IP), Bluetooth, ZigBee, Digital Enhanced Cordless Telecommunications (DECT), or Near Field Communication (NFC) address.

8. The mobile device of claim 5, wherein execution of the programming by the processor further configures the mobile device to perform functions to:
pair the mobile device with a second wearable device of the plurality of wearable devices via the wireless network by:
assigning a second wearable device identifier to the second wearable device;
generating a second wearable device entry in the wearable device table; and
storing the second wearable device identifier in the second wearable device entry;
receive second private user data from the second wearable device via the wireless network, wherein the mobile device does not store the second private user data in volatile or non-volatile storage before receiving the second private user data;
store the second private user data received from the second wearable device in volatile storage on the mobile device in association with the second wearable device identifier where the second private user data originated; and
in response to a second user input on the mobile device that changes the second private user data, modify the second private user data in the volatile storage, the second modified private user data including the second private user data received from the second wearable device and the changes from the second user input on the mobile device.

9. The mobile device of claim 8, wherein execution of the programming by the processor further configures the mobile device to perform functions to:

in response to pairing the mobile device with the second wearable device via the wireless network, display a list of the paired wearable devices in a graphical user interface on the mobile device;

receive a user selection of one or more of the paired wearable devices to synchronize the first or second modified private user data with from the graphical user interface; and in response to the user selection from the graphical user interface, selectively synchronize the first or second modified private user data on the mobile device with the selected wearable devices.

10. The mobile device of claim 8, wherein:

storing the first private user data from the first wearable device in volatile storage on the mobile device further includes storing the first private user data in association with the first wearable device identifier where the first private user data originated; and execution of the programming by the processor further configures the mobile device to perform a further function to:

selectively synchronize the second private user data with only the second wearable device by only sending the second modified private user data or a portion thereof to the second wearable device based on the stored associated second wearable device identifier.

11. The mobile device of claim 8, wherein:

the second wearable device entry of the wearable device table includes a modification status field indicating whether the second private user data received from the second wearable device is modified;

the modification status field is set in response to the second user input on the mobile device that changes the second private user data;

execution of the programming by the processor further configures the mobile device to perform functions to:

in response to the second user input on the mobile device that changes the second private user data received from the second wearable device stored in the volatile memory, set the modification status field to indicate modification of the second private user data; and in response to setting of the modification status field, synchronize changes to the second private user data to the second wearable device.

12. The mobile device of claim 8, wherein execution of the programming by the processor further configures the mobile device to perform functions to:

in response to a third user input on the mobile device that changes the first modified private user data, alter the first modified private user data in the volatile storage, the first altered modified private user data including the first modified private user data and the changes from the third user input on the mobile device;

detect a timeout period elapsing in which the mobile device fails to communicate with the first wearable device via the wireless network or a predetermined number of reconnection attempts with the first wearable device is exceeded;

in response to detecting the timeout period elapsing or the predetermined number of reconnection attempts with the first wearable device is exceeded:

synchronize the first altered modified private user data on the mobile device with the second wearable device by sending the first altered modified private user data or a portion thereof to the second wearable device; and update the first wearable device entry of the wearable device table to delete the first wearable device identifier and store the second wearable device identifier.

13. The mobile device of claim 1, wherein the first modified private user data or the portion thereof is sent in real time to the first wearable device or periodically at or after a synchronization time period that is an adjustable time interval set by a user of the mobile device.

14. The mobile device of claim 1, wherein the first private user data includes a picture, videos, a bank account, credit card information, a user id, a password, an email, or a text message.

15. The mobile device of claim 1, wherein the wireless network is Bluetooth, near field communication (NFC), WiFi, ZigBee, or a mobile telecommunication network.

16. A wearable device, comprising:

a wireless network communication interface for communication over a wireless network;

a processor coupled to the wireless network communication interface;

a memory accessible to the processor; and programming in the memory, wherein execution of the programming by the processor configures the wearable device to perform functions, including functions to:

pair the wearable device with a mobile device via the wireless network;

send private user data to the mobile device via the wireless network;

receive updated private user data from the mobile device; and send a deletion command to delete the private user data and the updated private user data on the mobile device.

17. The wearable device of claim 16, wherein the deletion command is sent in response to a shutdown signal being inputted on the wearable device to power off or restart the wearable device.

18. A non-transitory machine-readable medium containing machine-readable programming instructions, the instructions causing a mobile device to:

pair a mobile device with a plurality of wearable devices via at least one wireless network;

receive respective private user data from a respective wearable device via the at least one wireless network, wherein the mobile device does not store the respective private user data in volatile or non-volatile storage before receiving the respective private user data from the respective wearable device;

store the respective private user data received from the respective wearable device in volatile storage on the mobile device; and in response to generation of a deletion command received from the respective wearable device, release the respective modified private user data.

19. The non-transitory machine-readable medium of claim 18 containing machine-readable programming instructions, the instructions further causing a mobile device to:

receive user input on the mobile device that changes the respective private user data;

in response to the user input, modify the respective private user data in the volatile storage, the respective modified private user data including the respective private user data received from the respective wearable device and the changes from the user input on the mobile device; and synchronize the respective private user data on the mobile device with the respective wearable device by sending the respective modified private user data or a portion thereof to the respective wearable device.

20. The non-transitory machine-readable medium of claim 18 containing machine-readable programming instructions, wherein releasing the modified private user data further causes the mobile device to:
send the respective modified private user data in a final state to the respective wearable device; and
delete the respective modified private user data from the mobile device.

\* \* \* \* \*